United States Patent
Debenedetti et al.

(10) Patent No.: US 11,621,773 B2
(45) Date of Patent: Apr. 4, 2023

(54) METHOD AND DEVICE FOR FORWARDING A DIGITAL SIGNAL

(71) Applicant: Telefonaktiebolaget LM Ericsson (publ), Stockholm (SE)

(72) Inventors: Paolo Debenedetti, Genoa (IT); Raoul Fiorone, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 235 days.

(21) Appl. No.: 16/963,237

(22) PCT Filed: Feb. 15, 2018

(86) PCT No.: PCT/EP2018/053829
§ 371 (c)(1),
(2) Date: Jul. 19, 2020

(87) PCT Pub. No.: WO2019/158205
PCT Pub. Date: Aug. 22, 2019

(65) Prior Publication Data
US 2021/0367665 A1   Nov. 25, 2021

(51) Int. Cl.
H04B 10/032   (2013.01)
H04B 10/2575   (2013.01)
(Continued)

(52) U.S. Cl.
CPC ..... *H04B 10/032* (2013.01); *H04B 10/25752* (2013.01); *H04J 3/065* (2013.01);
(Continued)

(58) Field of Classification Search
CPC ............ H04B 10/032; H04B 10/25752; H04B 10/075; H04B 10/0775; H04J 3/065;
(Continued)

(56) References Cited

U.S. PATENT DOCUMENTS

2010/0220728 A1   9/2010   Williams et al.
2013/0132789 A1*  5/2013   Watford ................... H04L 1/08
                                                           714/752

FOREIGN PATENT DOCUMENTS

EP   0792545 B1   11/2005
EP   1929681 A2    6/2008
(Continued)

OTHER PUBLICATIONS

PCT International Search Report, dated Oct. 29, 2018, in connection with International Application No. PCT/EP2018/053829, all pages.
(Continued)

*Primary Examiner* — Hibret A Woldekidan
(74) *Attorney, Agent, or Firm* — Christopher & Weisberg, P.A.

(57) ABSTRACT

There is provided a method and device for forwarding a digital signal arranged into portions that each contain a timestamp and an error detection code. Duplicates of the digital signal are received on a first optical path and a second, separate optical path. Corresponding timestamps are identified in the signals and used to synchronize corresponding portions of the signals. The error detection codes in the synchronized portions are used to allow one and only one of the corresponding portions to be selected for forwarding. The selected portions are then forwarded.

20 Claims, 8 Drawing Sheets

(51) Int. Cl.
*H04J 3/06* (2006.01)
*H04J 3/14* (2006.01)
*H04L 1/00* (2006.01)
*H04L 1/02* (2006.01)
*H04L 1/08* (2006.01)

(52) U.S. Cl.
CPC .............. *H04J 3/14* (2013.01); *H04L 1/0061* (2013.01); *H04L 1/02* (2013.01); *H04L 1/08* (2013.01); *H04L 2001/0097* (2013.01)

(58) Field of Classification Search
CPC . H04J 3/14; H04L 1/0061; H04L 1/02; H04L 1/08; H04L 2001/0097; H04L 2212/00; H04L 1/22; H04L 43/106; H04L 1/0057; H04L 5/0048; H04L 1/00; H04L 1/1812
USPC .................................. 398/1–5, 8, 25, 30, 35
See application file for complete search history.

(56) References Cited

FOREIGN PATENT DOCUMENTS

| WO | 2007027870 A2 | 3/2007 |
| WO | 2015113643 A1 | 8/2015 |
| WO | 2016005008 A1 | 1/2016 |
| WO | 2016138950 A1 | 9/2016 |
| WO | 2017012635 A1 | 1/2017 |
| WO | 2018104175 A1 | 6/2018 |

OTHER PUBLICATIONS

PCT Written Opinion, dated Oct. 29, 2018, in connection with International Application No. PCT/EP2018/053829, all pages.
CPRI Specification V7.0 (Oct. 9, 2015), Common Public Radio Interface (CPRI); Interface Specification, 128 pages.
ECPRI Specification V1.0 (Aug. 22, 2017), Common Public Radio Interface; eCPRI Interface Specification, 62 pages.

* cited by examiner

METHOD AND DEVICE FOR FORWARDING A DIGITAL SIGNAL

TECHNICAL FIELD

The present invention relates to optical networks in general and to forwarding a digital signal received in an optical network in particular.

BACKGROUND

There are many applications where forwarding signals across an optical network with high reliability and low latency are especially important. On such application is the "fronthaul" transport of traffic within a split Radio Base Station (RBS) of a radio access network (RAN).

A RAN comprises base stations which provide wireless coverage over a geographical area, typically called a cell. Operators can use small cells (such as micro cells or pico cells) to expand capacity and fill coverage holes in their networks cost-effectively. In some base station implementations, the radio unit (RU) and baseband processing equipment (also called a digital unit DU) are combined as a single unit. In other implementations, the RU and DU are separated. The RU and DU can be split although both located at the same site (geographical location) or can be split between two different sites (geographical locations). In the latter case, the RU is generally called a remote radio unit (RRU). The RU translates a received RF signal into an in-phase/quadrature (IQ) signal (standardized as common public radio interface CPRI) to the baseband and vice versa.

When split, the DU and RU are often connected via an optical network, whether split within a site or across sites. When split across sites, DUs may be centralized at a remote location, for example a few kilometers from the RRUs. The RRUs are placed close to the radio antennas, e.g. in antenna masts. This minimizes feeder and jumper losses between antenna and RRUs, which is often a major challenge to address in most radio transport networks, for example, to enhance the uplink capacity of mobile services. The signal processing is centralized in a DU, which offers processing resources for multiple cells, each covered by an antenna driven by a RRU. This allows a pool of processing resources to be dynamically shared among many cells, in line with the cloud computing principle, saving energy, improving the radio link reliability, and decreasing number and size of access sites.

Separating DUs and RUs creates opportunities for network optimization. An active Remote Radio Unit (RRU) may be connected to a centralized pool of DUs by means of CPRI flows across a geographical area. Transport of traffic between distributed parts of a split RBS is called "fronthaul". The term "backhaul" describes transport of traffic to/from a base station which has RF and baseband processing at the same site. Architecture for an optical network to support such a separated arrangement of RRUs and a DU pool is shown in FIG. 1 and is described in more detail in WO2016/005008.

The optical fronthaul network depicted in FIG. 1 can also be adapted to transport a mix of CPRI traffic, originated by RRUs within the split RBS, and Ethernet traffic originated by other RBSs (and pico-RBSs in particular). These clients' signals can be delivered over separate lambdas (wavelengths) in the same Wavelength Division Multiplexed (WDM) flow or, alternatively, over a shared lambda (sub-wavelength) via multiplexing. An ad-hoc framing for the hybrid CPRI/Ethernet transport on optical fronthaul (OFH) is described in WO2016/138950. The evolution of OFH architecture to transport CPRI and Ethernet is named "xhaul" to specify that the optical network acts as fronthaul for RRUs and as backhaul for RBSs. FIG. 2 shows an example of xhaul architecture. The architecture also allows the transport of future Ethernet based fronthaul traffic.

Fronthaul and xhaul networks must meet very stringent requirements on latency, frame alignment and synchronization. Very minimal latency of <100 microseconds and transparent mapping of signals between the RRU and DU are required. Commonly, traffic protection (line or ring, depending on the network topology) is required in the fronthaul and xhaul networks optical portion to increase the network availability and ensure service continuity.

In fronthaul/xhaul optical networks, protection is normally provided by using optical splitters to duplicate the CPRI signals, and the duplicated signals are transmitted over two different optical paths. Optical switches located at the destination select the better signal for forwarding. The selection of the better signal is typically based on analog criteria to have cheap and transparent solutions. In practice, the signal transmitted over one optical path (the working path) is preferred to the signal transmitted over the other optical path (the protection path). The optical switch is a physical switch and will be set to forward the signal transmitted over the working path unless an error is detected in that signal. Commonly, an optical detector is used that just looks for a loss of optical power to indicate an error in the signal on the working path. When such an error is detected, the optical switch will physically switch to the protection path before optionally reverting to the working path (for example after a pre-set period of time or when optical power is detected on the working path again).

Typical protection mechanisms available for an optical transport network are not best suited to a fronthaul/xhaul solution for effective transport of CPRI clients because these mechanisms are not transparent to CPRI framing and network synchronization, and create considerable latency and jitter for the RUs and DUs. Also, such mechanisms cannot guarantee loss-less operation, and this creates a problem to the RUs which are very sensitive to CPRI frame sequence and restart in case of losses with consequent loss of radio connectivity for the end-users until the restart has completed.

Differential delays between the working and protection paths are commonly static and can be calculated and compensated for in advance at the transmitting side, but this does not solve the problem of the loss-of-frame sequence of CPRI signals. FIG. 3 shows a typical arrangement that provides delay compensation at the transmitting node (e.g. RRU) and optical switching for the selection of the better signal at the receiving node (e.g. DU).

The method described above has other reasons which may cause CPRI loss-of-frame, namely (a) the time to detect a signal failure, either using physical methods such as optical power measurement or operations, administration and maintenance (OAM) messages, (b) the time for the physical switch from working path to protection path, and (c) the time to revert from protection path back to worker path, if reversion is used. The typical protection switching mechanisms of optical transport networks normally detect the need for switching in the milliseconds range (typically around 10 milliseconds) and the whole protection procedure completes in around 50 milliseconds. Even this value is quite a challenge for some technologies, depending on the type of implementation. For applications in RANs, CPRI frames have a fixed frequency of 3.84 MHz which translates into frame duration of around 260 nanoseconds. Clearly such protection procedures cannot achieve this performance target.

Accordingly, there is a need for better forwarding of signals within an optical network, such as a fronthaul or xhaul network, which provides better reliability and lower latency.

SUMMARY

There is provided a method of forwarding a digital signal received in an optical network. The method comprises receiving duplicates of the digital signal. The digital signal is arranged into portions with each portion containing a timestamp and an error detection code. The duplicates are received as a first digital signal on a first optical path of the optical network and a second digital signal on a second optical path of the optical network. The second optical path is separate to the first optical path. The method also comprises identifying corresponding timestamps in the first and second digital signals. Identified corresponding timestamps are used to synchronize corresponding portions of the first and second digital signals such that corresponding timestamps are synchronized. At least one of the error detection codes is used to select one and only one of the corresponding portions of the first and second digital signals for forwarding. Then, the method comprises forwarding the selected portions of the first and second digital signals thereby forwarding the digital signal.

There is also provided a device configured to perform any of the methods described herein including the method set out in the preceding paragraphs. Hence, there is also provided a device for forwarding a digital signal received in an optical network. The device is configured to receive duplicates of the digital signal. The digital signal is arranged into portions with each portion containing a timestamp and an error detection code. The device is configured to receive the duplicates as a first digital signal on a first optical path of the optical network and a second digital signal on a second optical path of the optical network. The second optical path is separate to the first optical path. The device is configured to identify corresponding timestamps in the first and second digital signals. The device is also configured to use identified corresponding timestamps to synchronize corresponding portions of the first and second digital signals such that corresponding timestamps are synchronized. The device is configured to use at least one of the error detection codes to select one and only one of the corresponding portions of the first and second digital signals for forwarding. The device is also configured to forward the selected portions of the first and second digital signals thereby forwarding the digital signal.

There is also provided a device for forwarding frames of a digital signal received from an optical network. The device comprises processing circuitry and a memory containing instructions executable by said processing circuitry. The device is operative to receive duplicates of the digital signal. The digital signal is arranged into portions with each portion containing a timestamp and an error detection code. The device is operative to receive the duplicates as a first digital signal on a first optical path of the optical network and a second digital signal on a second optical path of the optical network. The second optical path is separate to the first optical path. The device is operative to identify corresponding timestamps in the first and second digital signals. The device is operative to use identified corresponding timestamps to synchronize corresponding portions of the first and second digital signals such that corresponding timestamps are synchronized. The device is operative to use at least one of the error detection codes to select one and only one of the corresponding portions of the first and second digital signals for forwarding. The device is operative to forward the selected portions of the selected one of the first and second digital signals thereby forwarding the digital signal.

There is also provided a device for forwarding frames of a digital signal received from an optical network, wherein the device comprises the following modules.

A module for receiving duplicates of the digital signal, wherein the digital signal is arranged into portions with each portion containing a timestamp and an error detection code, and the duplicates are received as a first digital signal on a first optical path of the optical network and a second digital signal on a second optical path of the optical network that is separate to the first optical path.

A module for identifying corresponding timestamps in the first and second digital signal.

A module for using identified corresponding timestamps to synchronize corresponding portions of the first and second digital signals such that corresponding timestamps are synchronized.

A module for using at least one of the error detection codes to select one and only one of the corresponding portions of the first and second digital signals for forwarding.

A module for forwarding the selected portions of the first and second digital signals thereby forwarding the digital signal.

There is also provided a computer program comprising instructions which, when executed on processing circuitry, cause the processing circuitry to carry out any of the methods described herein including the methods described above. There is also provided a carrier containing such a computer program, wherein the carrier is one of an electronic signal, optical signal, radio signal or computer readable storage medium. There is also provided a computer readable storage medium having stored thereon such a computer program.

DETAILED DESCRIPTION

Figure 1:
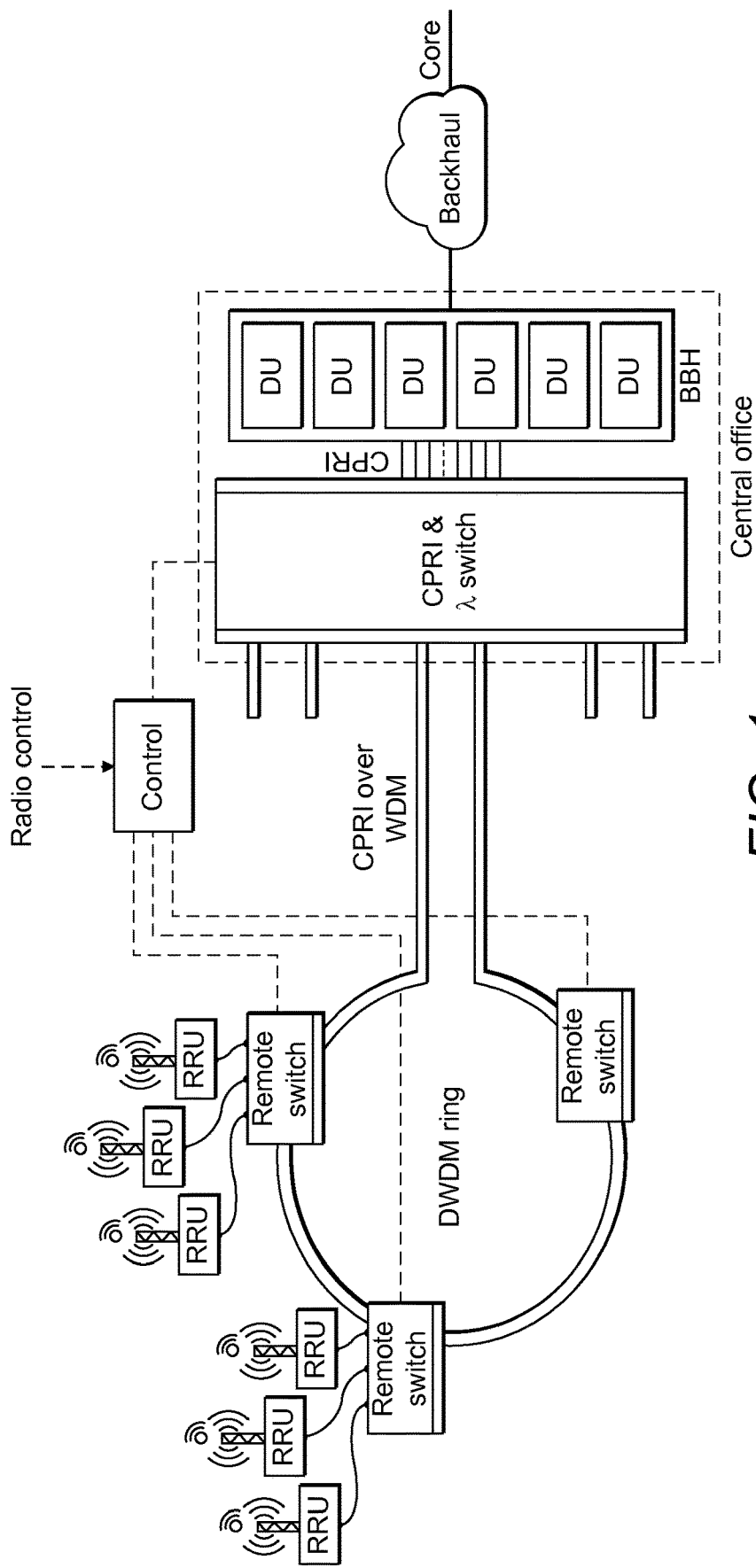
FIG. 1 schematically illustrates an example of an optical fronthaul network.
Figure 2:
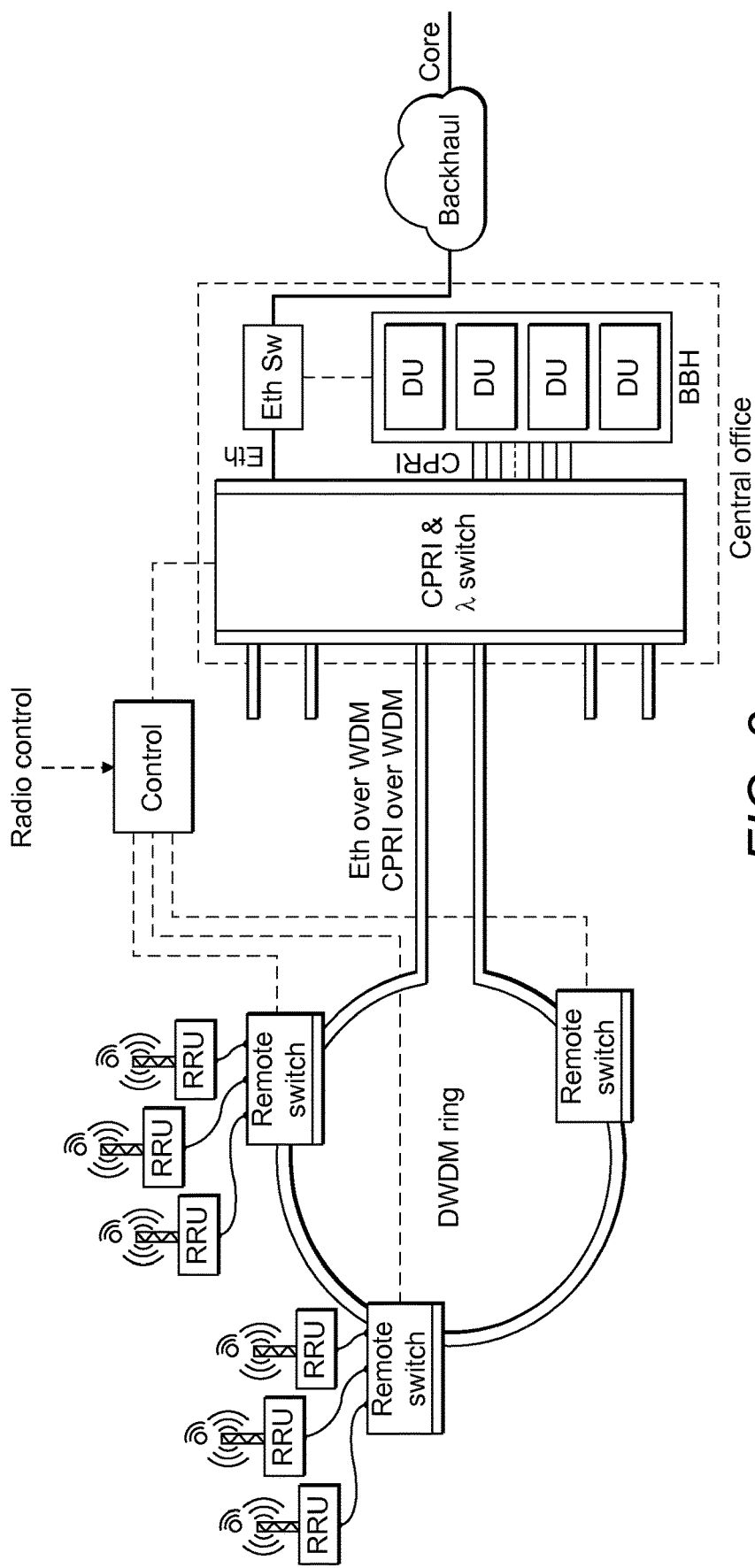
FIG. 2 schematically illustrates an example of an optical xhaul network.
Figure 3:
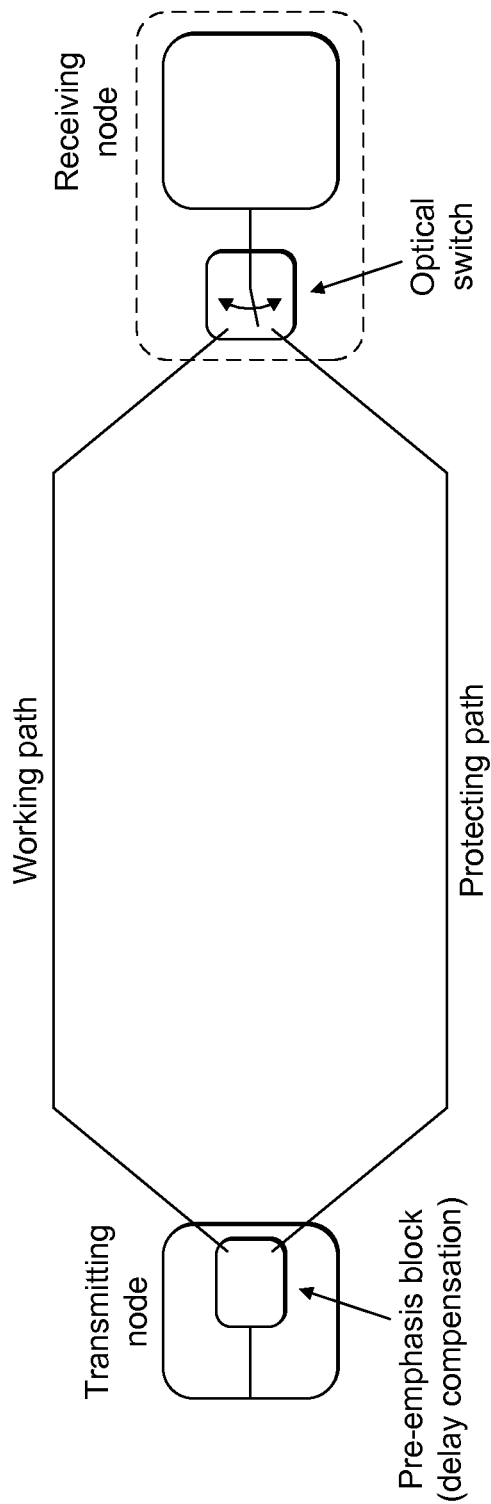
FIG. 3 schematically illustrates an example of an arrangement that provides traffic protection using delay compensation at the transmitting node and optical switching at the receiving node.

In the following, concepts in accordance with exemplary embodiments of the invention will be explained in more detail and with reference to the accompanying drawings. The illustrated embodiments relate to a method and device of forwarding a digital signal that was sent across an optical network as duplicates on separate optical paths. The embodiments may relate to fronthaul optical networks like those described above in respect of radio area networks (RANs).

Embodiments of the invention provide a fault-tolerant mechanism that increases in-service performance for radio units (RUs) and avoids unnecessary RU restart in the case of failure of a protected fronthaul link. In-service performance is particularly important for the support of 5G networks since it provides the umbrella control plane support in 5G non-standalone (NSA) networks. Embodiments of the invention allow a RAN to reach higher availability and service continuity, thus facilitating more demanding evolutions towards 5G and critical applications.

In particular, embodiments of the invention may advantageously provide timestamps to successive portions of the digital signal at the transmitting node, use auto-adjustable delay functions to bring the timestamps of the duplicates of the digital signal into synchronization. Error corrections codes also added to the successive portions of the digital signal are used to make forwarding decisions (traffic selection) on the corresponding portions of the duplicates of the digital signal synchronously.

By synchronizing the duplicates of the digital signal using the timestamps, embodiments of the invention may be used in any network topology, either linear or ring, since differential delay between the two paths used is compensated. Furthermore, embodiments that provide a capability for self-adjustment of the delay functions to ensure synchronization of corresponding portions of the duplicates of the digital signal are suitable for software defined networks (SDN) in which the two optical paths may not necessarily be the same all the time.

In addition, embodiments of the invention allow seamless selection of either optical path to provide an error-free traffic path in a way that obviates the need for an actual protection switch. Advantageously, this minimizes the detection and switching times, bringing it to within the timescales necessary for handling CPRI signals within a fronthaul/xhaul network. As selection is seamless, both paths are essentially equivalents and portions of the digital signal may be selected from either for forwarding. Hence, embodiments of the invention do not comprise a "preferred" working path and a "secondary" protection path in the way that the prior art described above does.

While embodiments of the invention are well suited for CPRI networks, other embodiments are applicable to other types of client signals because it makes no assumption as to signal type beyond the ability to add timestamps. For example, embodiments of the invention may allow forwarding of Ethernet signals. Generally, buffers are used to store the synchronized duplicate signals, and the depth of the buffer may be varied depending on the length of the portions of the digital signal that contain the timestamps.

Figure 4:
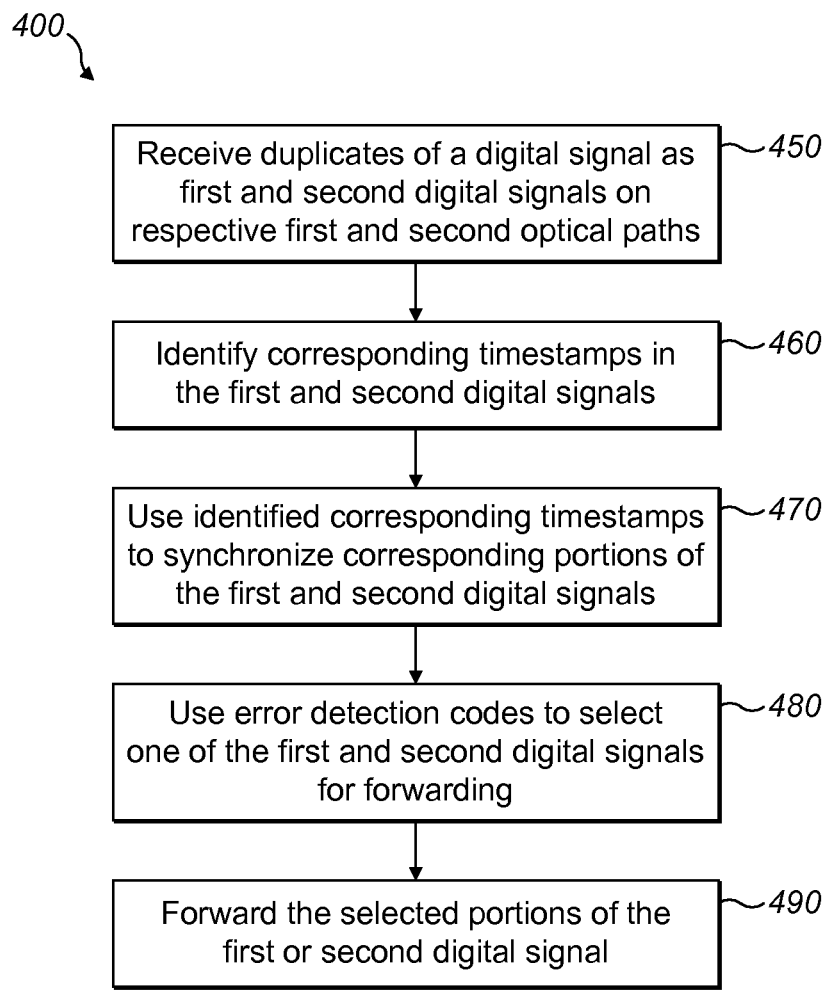
FIG. 4 schematically illustrates a method of forwarding a digital signal received in an optical network according to an embodiment of the invention.

FIG. 4 schematically illustrates a method 400 of forwarding a digital signal received in an optical network according to an embodiment of the invention. At step 450, the method 400 comprises receiving duplicates of a digital signal. The digital signal, and hence each of the duplicates, is divided into portions with each portion containing a timestamp and an error detection code.

What is referred to as a "portion" of the first and second signals (and hence the digital signal) may be any part of the digital signal. It is convenient to define a "portion" as the part of the digital signal that contains the timestamp. For example, where only a single timestamp is added to a digital signal, the portion may be the whole of the input digital signal (for example, where the digital signal is sent as a continuous stream of data that is not sub-divided into sections such as frames with headers. Where two timestamps are added to a digital signal, each portion may be half the length of the digital signal. Timestamps may be added periodically to a digital signal, for example to a digital signal divided into frames (e.g. equivalent to a CPRI frame).

The timestamps may be added at a preset frequency that may be arranged in equal divisions of time of equal divisions of length (i.e. such that each portion contains a preset number of bits). For instance, many digital signals are divided into sections or frames defined by a header and a payload. A timestamp may be added to each section/frame, for example as an overhead in the section/frame header.

Alternatively, a timestamp may be added once to a block of sections/frames, for example once every three sections/frames. For digital signals that are not regularly divided into sections/frames defined by a header (e.g. in case of packets with different length), the digital signals may be divided into portions by adding a wrapper for each portion of the digital signal with the timestamp appearing as an overhead in the wrapper. As will be appreciated, a portion may be any sub-division of the digital signal and may or may not coincide with any division of the digital signal into sections that may already be present.

A possible additional embodiment of this invention supports synchronization of the portion with the input digital signal frame. In this case the system will search for the frame alignment word (FAW), start the portion on detection of the FAW and terminate the portion on detection of one of the next received FAWs. This method can be used for known digital signals where the jitter (due to frame segmentation into portions) must be minimized.

The error detection codes may be added to the portions defined by the timestamps. That is, each portion of the digital signal will include both a timestamp and an error detection code. The error detection code may be implemented as a forward error detection mechanism calculated over the portion. For instance, an error detection code such as a cyclic redundancy check (CRC) code may be added to each portion.

At step 450, the method 400 comprises receiving the duplicates containing the timestamps and the error detection codes as a first digital signal on a first optical path of the optical network and a second digital signal on a second optical path of the optical network. The second optical path is separate to the first optical path.

At step 460, the method 400 comprises identifying corresponding timestamps in the first and second digital signals. For example, the first and second digital signals may be continually monitored as they are received, and any timestamps detected. Then, corresponding timestamps (e.g. identical timestamps that indicate the same instance in time) may be identified in the first and second digital signals.

At step 470, the method 400 comprises using identified corresponding timestamps to synchronize corresponding portions of the first and second digital signals such that corresponding timestamps are synchronized. For example, for each identified pair of corresponding timestamps, the corresponding portions of the first and second digital signals including the timestamps may be brought into synchronization.

Step 470 may comprise applying time delays to one of the first and second digital signals to bring the corresponding portions of the first and second digital signals into synchronization. For example, step 470 may comprise determining a time delay between receiving each pair of corresponding timestamps of the first and second digital signals. For each pair of corresponding timestamps, the determined time delays may then be applied to the earlier of the first and second digital signals to be received. This will bring each pair of corresponding portions of the first and second digital signals into synchronization. Step 470 may comprise applying time delays to both first and second digital signals, and adjusting the difference between the time delays to ensure that the corresponding portions of the first and second digital signals are brought into synchronization.

Step 470 may comprise sending the synchronized portions of the first and second digital signals to a buffer. For example, the time delay may be applied to the earlier of the first and second digital signal to arrive as the first and second digital signals are passed into a buffer thereby ensuring the first and second portions align in the buffer. The buffer may hold more than a single pair of corresponding portions at any one time. For instance, the buffer may have a depth of fewer than ten portions such as three or four portions, i.e. three or four successive portions of each of the first and second digital signals may be stored in the buffer.

At step 480, the method 400 comprises using at least one of the error detection codes to select one and only one of the corresponding portions of the first and second digital signals for forwarding, for example based on a CRC code added to each portion. Where there is a buffer containing multiple portions of each of the first and second digital signals, the error detection codes of the oldest pair of corresponding portions may be used. According to how step 480 is implemented, only one of the error detection codes of the synchronized portions may be used or the error detection codes of the synchronized portions of both first and second digital signals may be used. Some examples of how the error detection code(s) is(are) used will now be presented.

According to a first embodiment, the error detection code in the corresponding portion of the earlier of the first and second digital signals to be received is used to determine whether the errors in each corresponding portion of the earlier of the first and second digital signals to be received meets a required quality. If the portion meets the required quality, this portion is selected. If the portion does not meet the required quality, either (i) the other of the corresponding portions may be selected, or (ii) the error detection code of the other corresponding portion may be used to determine whether the errors in the other corresponding portion meets a required quality before selecting the other corresponding portion.

According to a second embodiment, the error detection codes of both corresponding portions are used to determine errors in the corresponding portions and the corresponding portion of the digital signal containing the least errors is selected.

According to a third embodiment, it is determined whether the corresponding portions of the first and second digital signals are identical. If the corresponding portions are determined not to be identical, the error detection codes of both corresponding portions are used to determine errors in the corresponding portions and the corresponding portion containing the least errors is selected. Optionally, if the corresponding portions are determined to be identical, the corresponding portion of the earlier of the first and second digital signals to be received is selected.

At step 480, the method 400 comprises forwarding the selected portions of the first and second digital signal. For example, the method 400 may comprise forwarding selected portions to a DU for processing (e.g. reformatting) with further onward transmission of the digital signal to the core of the RAN. The processing performed at the receiving node to select portions from the first and second digital signal may be transparent to the DU.

The method 400 of FIG. 4 may continuously repeat, for example as successive portions of a digital signal are received across the first and second optical paths. Different steps in the method 400 may be performed concurrently, for example step 480 may be performed to analyze earlier portions of the digital signal at the same time as step 470 is being performed to synchronize later portions of the digital signal.

Figure 5:
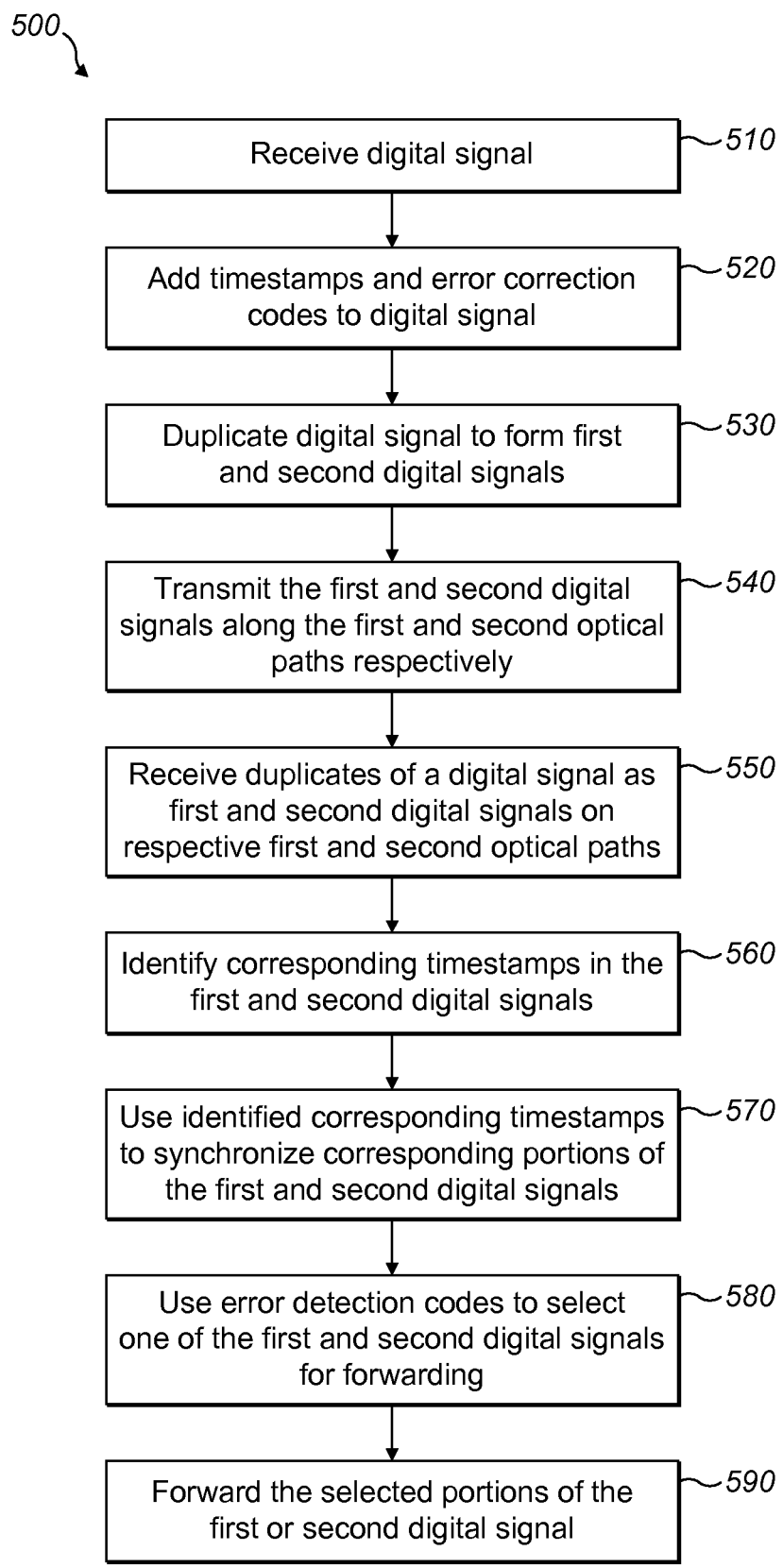
FIG. 5 schematically illustrates an extension of the method shown in FIG. 4.

FIG. 5 schematically illustrates a method 500 of forwarding a digital signal received in an optical network according to another embodiment of the invention. The embodiment of FIG. 5 is broadly like the embodiment of FIG. 4. However, whereas the method 400 of FIG. 4 starts with receiving duplicates of a digital signal, the method 500 of FIG. 5 starts with receiving a digital signal and later duplicating that digital signal before transmitting the duplicates.

Thus, at step 510, the method 500 comprises receiving a digital signal. The digital signal may be received from a RU. For example, a RU may receive an analog signal from an antenna, translate the analog signal into a digital CPRI signal, and forward that digital signal to be received at step 510. At step 520, the method 500 comprises adding timestamps and error detection codes to the received digital signal. There are many ways of adding timestamps and error detection codes, some examples of which have been described above in the discussion of step 450 of the method 400 of FIG. 4. For instance, a wrapper may be added to a digital signal which contains a timestamp and an error detection code such as a checksum, added as an overhead. The timestamp may take any form that allows the digital signal to be reformed while preferably minimizing jitter and delay. For example, the timestamp may be a code that provides an indication of the absolute time the timestamp was added or the time difference with respect to the previously delivered time-stamp.

Then, at step 530, the method 500 comprises duplicating the digital signal to produce the first and second digital signals. As the timestamp and error detection code have already been added, the first and second digital signals will both contain the timestamp and error detection code. The entire digital signal could be duplicated as one step, although the digital signal may be duplicated in multiple steps. For example, the digital signal may be duplicated one portion at a time. Alternatively, multiple portions of the digital signal may be duplicated at each step or fractions of a portion may be duplicated at each step.

In alternative embodiments, steps 520 and 530 are reversed. That is, the digital signal is first duplicated to form the first and second digital signals, and then a common timestamp and an error detection code are added to each of the first and second digital signals. In these embodiments, the common timestamp is added to occupy the same position within corresponding portions of both the first and second digital signals.

At step 540, the method 500 comprises transmitting the first digital signal along a first optical path from a transmitting node to a receiving node and sending the second digital signal along a second optical path from the transmitting node to the receiving node. The first and second optical paths are separate from each other. For example, the first optical path may be one optical fiber of a bundle linking the transmitting node to the receiving node and the second optical path may be another optical fiber of the bundle. Alternatively, the first and second optical paths may be optical fibers that do not belong to the same bundle and may even take different routes from the transmitting node to the receiving node.

At step 550, the method 500 comprises the receiving node receiving the duplicates containing the timestamps and the error detection codes as the first digital signal on the first optical path and the second digital signal on the second optical path. This step is the same as step 450 of FIG. 4. Moreover, steps 560 to 590 of FIG. 5 are the same as steps 460 to 490 of FIG. 4, and so will not be described again.

As was noted for the method 400 of FIG. 4, the method 500 of FIG. 5 may continuously repeat. This applies to steps 510 to 540 as well as steps 550 to 590. For example, different steps in the method 500 may be performed concurrently. Step 540 that sees the first and second digital signals transmitted to the receiving node may be performed as the following portion of the digital signal is being duplicated at step 530.

Figure 6:
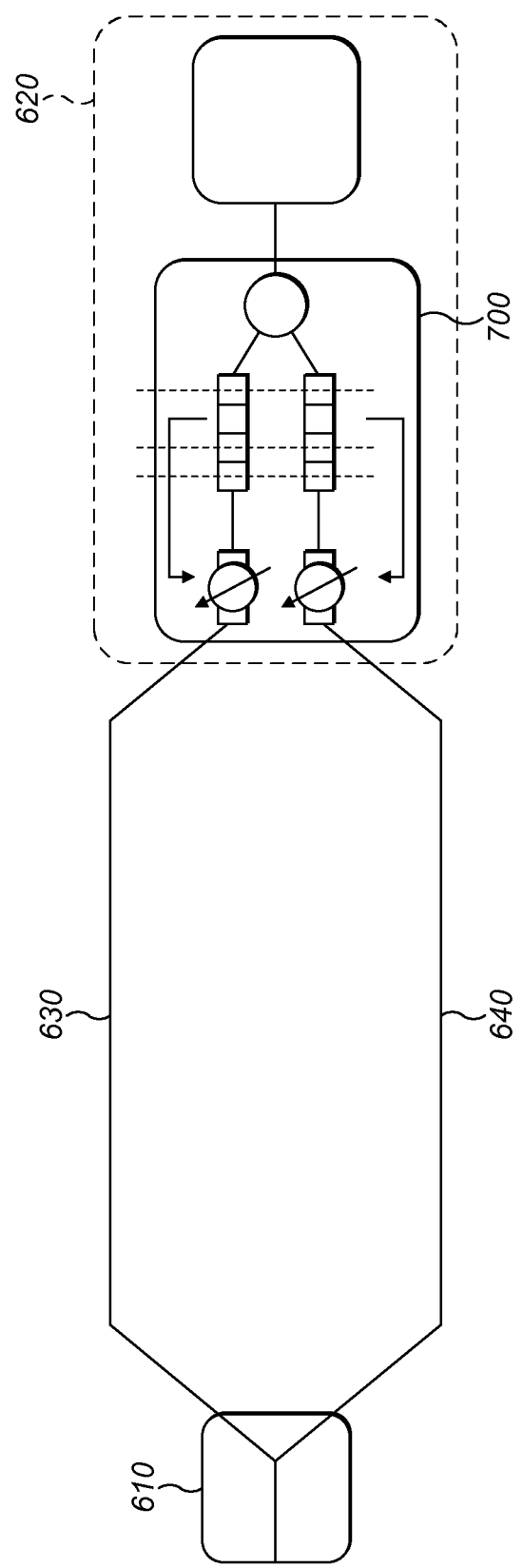
FIG. 6 schematically illustrates an example of an arrangement that provides traffic protection according to an embodiment of the invention.

FIG. 6 schematically illustrates an example of an arrangement that provides traffic protection according to an embodiment of the invention. FIG. 6 shows a transmitting node 610 and a receiving node 620, as well as a first optical path 630 and a second optical path 640, both of which link the transmitting node 610 to the receiving node 620. The transmitting node 610 may perform step 540 of FIG. 5, and also possibly steps 510 to 530. The receiving node 620 may perform steps 450 to 490 of FIG. 4 and steps 550 to 590 of FIG. 5.

Figure 7:
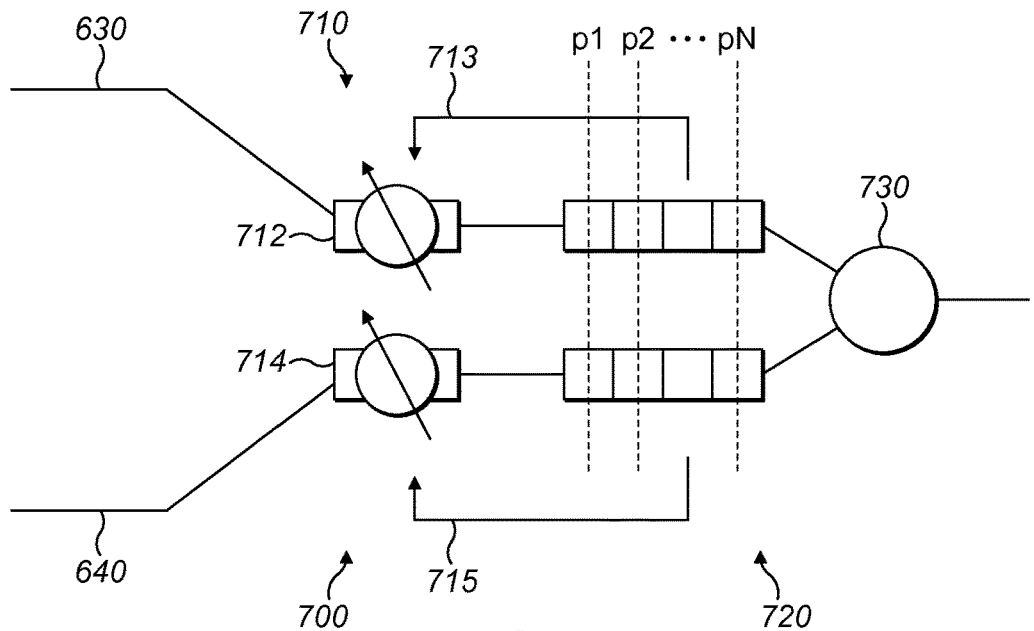
FIG. 7 shows the analysis and selection block of FIG. 6 in greater detail.

The receiving node 620 includes a signal portion processing block 700 that is responsible for synchronization of corresponding portions of the first and second digital signals, for analyzing the synchronized portions and for selection of one of the portions for forwarding. Hence, the signal portion processing block 700 may perform steps 450 to 480 of FIG. 4 and steps 550 to 580 of FIG. 5. More details of the signal portion processing block 700 will now be described with reference to FIG. 7.

The first part of the signal portion processing block 700 is a synchronizer 710 that is used to synchronize corresponding portions of the first and second digital signals. The synchronizer 710 is realized by a pair of adjustable delay blocks 712, 714 of which one is provided for each of the first and second optical paths 630, 640. The delay provided by each of the adjustable delay blocks 712, 714 is set based on the result of the analysis of previous portions of the first and second digital signals. The relative delay between the arrival of corresponding portions of the first and second digital signals is measured based on the timestamps contained in the first and second digital signals. This time of arrival of each corresponding timestamp in each of the first and second digital signals is fed back to the synchronizer 710 as indicated by arrows 713 and 715. The difference in the times of arrival are calculated, and the relative delay is applied by whichever of the adjustable delay blocks 712, 714 is processing the earlier arriving of the first and second digital signals. Thus, this feedback loop ensures synchronization of the first and second digital signals, and any drift away from synchronicity is quickly redressed by the feedback loop.

Once the relative delay is applied, the first and second digital signals are passed through a synchronous buffer 720, and thus can be analyzed in parallel. In this embodiment, a synchronous buffer 720 having a depth of four is shown, i.e. the synchronous buffer 720 holds the four most recent portions of the first and second digital signals as indicated by the labels p1, p2, . . . , pN (where N=4 in this example). The oldest pair of corresponding portions held in the synchronous buffer 720 are output to an analysis and selection block 730 that compares the corresponding portions and selects one of the corresponding portions for forwarding. In this embodiment, the analysis and selection block 730 uses the error detection codes included in the corresponding portions to determine which corresponding portion is the least affected by errors. The analysis and selection block 730 then selects whichever corresponding portion is determined to be the least affected and forwards that corresponding portion.

In this way, at any given time, the better of the corresponding portions of the first and second digital signals may be selected for forwarding, virtually without any detection time and any switching time (as there is no physical switch as in the prior art). The analysis time is included in the buffer depth, since this synchronous buffer 720 is dimensioned to allow for the signal processing performed, while the switching time is actually limited to the selection of the better of the corresponding portions for forwarding, without any physical switching taking place.

How the analysis and selection block 730 analyses and selects which of the corresponding portions to forward may be chosen from among a number of options and is essentially an implementation choice. For instance, rather than using the error detections codes of both corresponding portions to allow the portion least affected by errors to be selected, the analysis and selection block 730 can default to using only the error correction code of the portion of the earlier of the first and second digital signals to arrive to ensure that that portion is unaffected by errors (or, for instance, is only affected by less than a threshold amount) before selecting the earlier of the first and second digital signals to arrive for forwarding.

Embodiments of the present invention may be put to use in RANs (radio area networks), for example in the fronthaul transport of digital signals from a RU (radio unit) to a DU (digital unit). As discussed above, the RU may be a remote unit (RRU) at a different geographical location to the DU.

In this case, according to a first embodiment, the transmitting node 610 of FIG. 6 may be an active fronthaul node receiving CPRI signals from the DU in a central office. The fronthaul node may then perform steps 510 to 540 of FIG. 5, namely receive the CPRI signal from the DU, add the timestamp and error detection code to the frames of the CPRI signal, duplicate the CPRI signal and transmit the duplicates along the first and second optical paths to a remote fronthaul node close to the RRU. The remote fronthaul node may then perform steps 550 to 590 of FIG. 5, namely receive the duplicate signals, to identify corresponding timestamps, to synchronize corresponding frames of the duplicate signals, select frames from the duplicate signals and forward the selected frames to the RRU.

According to a second embodiment, the transmitting node 610 of FIG. 6 may be a remote fronthaul node close to the RRU. The remote fronthaul node may then perform steps 510 to 540 of FIG. 5, namely receive the CPRI signal from the RRU, add the timestamp and error detection code to the frames of the CPRI signal, duplicate the CPRI signal and transmit the duplicates along the first and second optical paths to an active fronthaul node receiving CPRI signals from the DU in a central office. The active fronthaul node may then perform steps 550 to 590 of FIG. 5, namely receive the duplicate signals, to identify corresponding timestamps, to synchronize corresponding frames of the duplicate signals, select frames from the duplicate signals and forward the selected frames to the DU.

Path protection may be provided for signals travelling in both directions across the optical network linking the RU and DU. For example, the remote fronthaul node close to the RRU may comprise both a transmitting node and a receiving node, and the active fronthaul node receiving CPRI signals from the DU may also comprise a transmitting node and a receiving node.

The delay introduced by the synchronization, buffering and selection mechanism illustrated by FIGS. 4 to 7 is compatible with an underlying application to optical transport of traffic in a fronthaul network and the delay the mechanism achieves is minimal. For example, the synchronizer 710 simply aligns the first and second optical paths 630, 640 to the slower of the paths, thus implicitly still within an acceptable range ensured by network design. The synchronous buffer 720 only needs to have a depth of a few portions (e.g. CPRI frames) of each duplicate signal, allowing for their processing and the seamless selection of a frame from one of the duplicate signals. Given a buffer depth of N CPRI frames, the synchronization, buffering and selection mechanism will add a latency of N×260 ns, which is a very small value assuming N is in the 1 to 10 range. Indeed, an appropriate depth for the synchronous buffer 720 may be suggested by a particular implementation, e.g. from a system's capability to process a CPRI frame.

Examples of applications to the fronthaul transport of CPRI signals will now be presented. As a first example, the transport of CPRI Option 8 clients using a synchronization buffer of depth 3 is presented. The data rate of CPRI Option 8 is defined as 10137.6 Mbit/s with a frame rate of 3.84 MHz. This resulted in a line rate with a digital wrapper of 11.3 Gbit/s.

As a first example, high density framing was employed such that a timestamp and checksum were added to every frame of the CPRI signal, which required 80 bits at 3.84 MHz (30 nanoseconds) for the timestamp and 16 bits were used at 3.84 MHz (6 nanoseconds) for the checksum. The buffer depth of 3 required 8208 bits (808 nanoseconds) assuming the wrapper is removed from the portions once the portions are out of the buffer.

As a second example, low density framing was employed such that a timestamp and checksum were added to every third frame of the CPRI signal, which required 80 bits at 1.28 MHz (10 nanoseconds) for the timestamp and 16 bits were used at 1.28 MHz (2 nanoseconds) for the checksum. The buffer depth of 3 required 24048 bits (2434 nanoseconds) assuming the wrapper is removed from the portions once the portions are out of the buffer.

In the first example of high density framing, a latency of less than 850 nanoseconds is added to allow for the synchronization, buffering and selection mechanism to work, while in the second example of low density framing the latency is less than 2450 nanoseconds, due to the per-block behavior with three frames instead of one.

It will be appreciated that there are some system design choices when implementing the invention, which may also be made to reflect the capability of the system and the type of implementation. Whatever the case, the mechanism may be intrinsically dimensioned on the underlying application, and therefore fully compatible with it. As in the low-density framing example above, the mechanism adds less than 2.5 microseconds latency for an application whose requirement is to stay within 100 microseconds. Different applications may call for different performance targets, but the invention allows for different system design choices to accommodate these targets.

In case the synchronous buffer 720 needs to be deeper to allow more time for frame analysis and selection, the latency is still very low. As a further example, high-density framing of a timestamp and checksum every frame was used with a synchronous buffer depth of 9. This required 80 bits at 3.84 MHz (30 nanoseconds) for the timestamp and 16 bits were used at 3.84 MHz (6 nanoseconds) for the checksum. The buffer depth of 9 required 24624 bits (2425 nanoseconds), assuming the wrapper is removed from the portions once the portions are out of the buffer.

In this example, the latency is essentially the same as in the low-density frame example presented above, confirming that it is possible to play with the system design parameters to adapt the invention to the implementation and to the application.

Figure 8:
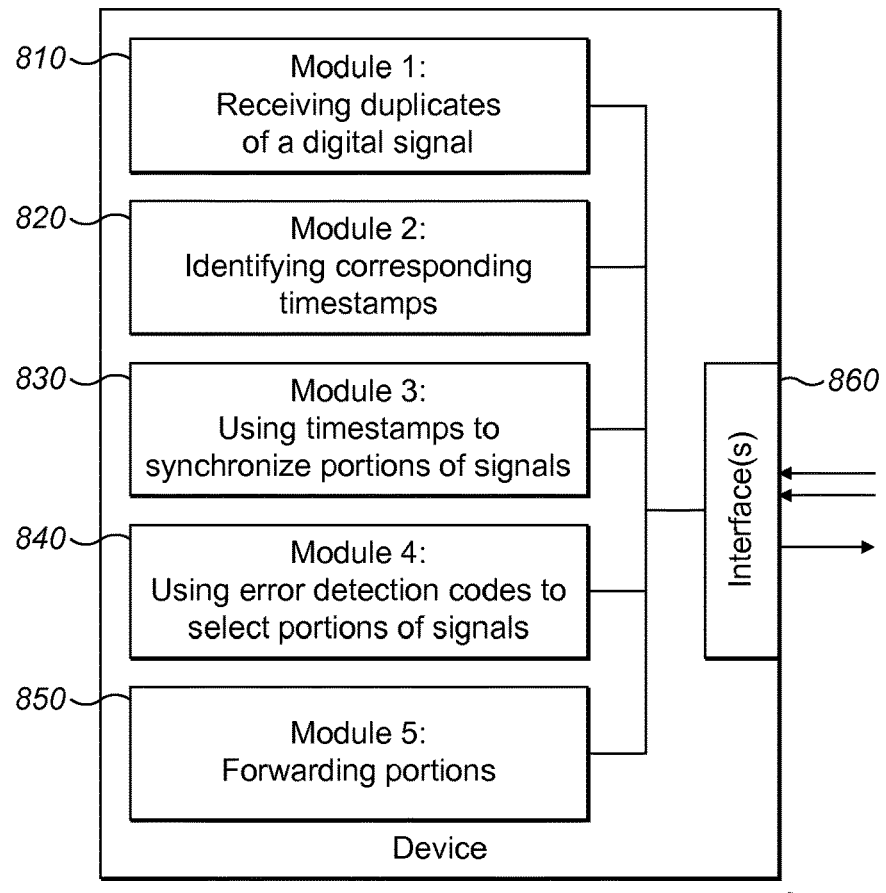
FIG. 8 schematically illustrates a device according to an embodiment of the invention.

FIG. 8 shows a block diagram for illustrating functionalities of a device for forwarding frames of a digital signal received from an optical network 800 which may perform the methods described above with respect to FIG. 4.

As illustrated, the device 800 may be provided with a module 810 configured to receive duplicates the digital signal, wherein the digital signal is arranged into portions with each portion containing a timestamp, and the duplicates are received as a first digital signal on a first optical path of the optical network and a second digital signal on a second optical path of the optical network that is separate to the first optical path, such as explained in connection with step 450 of FIG. 4.

Further, the device 800 may be provided with a module 820 configured to identify corresponding timestamps in the first and second digital signal, such as explained in connection with step 460 of FIG. 4. Further, the device 800 may be provided with a module 830 configured to use identified corresponding timestamps to synchronize corresponding portions of the first and second digital signals such that corresponding timestamps are synchronized, such as explained in connection with step 470 of FIG. 4.

Further, the device 800 may be provided with a module 840 configured to analyze the synchronized portions of the first and/or second digital signal to select one and only one of the corresponding portions of the first and second digital signals for forwarding, such as explained in connection with step 480 of FIG. 4. Further, the device 800 may be provided with a module 850 configured to forward the selected portions of the first and second digital signals thereby forwarding the digital signal, such as explained in connection with step 490 of FIG. 4.

The device 800 may also comprise one or more interfaces 860 for connecting to the optical network, for example to the transmitting node and to other network elements such as a RU or DU. Although FIG. 8 illustrates one embodiment in which the components of the device 800 are connected to a bus it would be clear for a person skilled in the art that alternative embodiments are also possible, e.g. connecting the components in series.

It is noted that the device 800 may include further modules for implementing other functionalities. Further, it is noted that the modules of the device 800 do not necessarily represent a hardware structure of the device 800, but may also correspond to functional elements, e.g., implemented by hardware, software, or a combination thereof.

Figure 9:
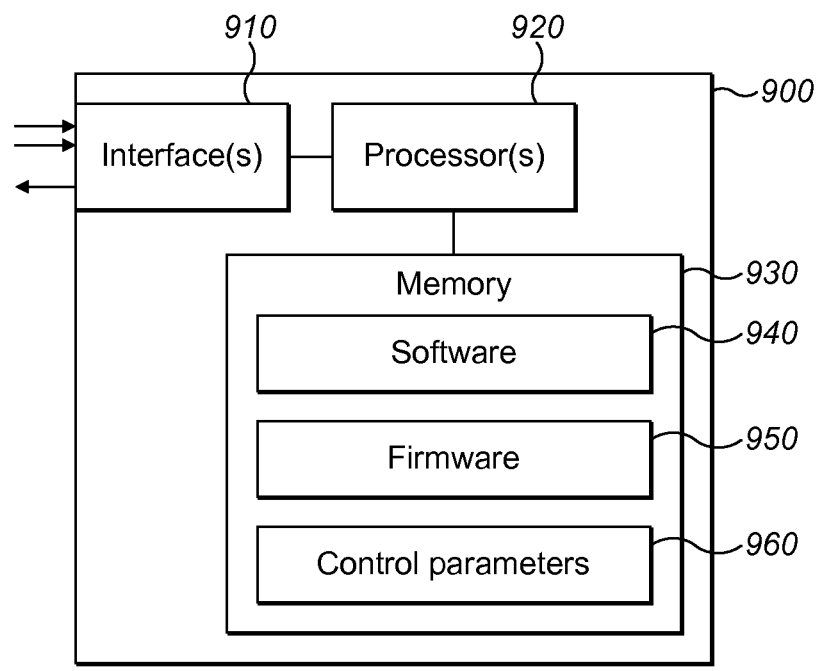
FIG. 9 schematically illustrates a device according to an embodiment of the invention.

FIG. 9 illustrates a processing circuitry-based implementation of a device 900 for forwarding frames of a digital signal received from an optical network which may be used for performing the methods described above with respect to FIG. 4.

As illustrated, the device 900 may include one or more interfaces 910 for communicating with an optical network. The interface(s) 910 may be used for receiving the first and second digital signals over the first and second optical paths.

Further, the device 900 may include processing circuitry coupled to the interface(s) 910. The processing circuitry may include one or more processors 920 and a memory 930 coupled to the processor(s) 920. By way of example, the interface(s) 910, the processor(s) 920, and the memory 930 could be coupled by one or more internal bus systems of the device 900. The memory 930 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 930 may include software 940, firmware 950, and/or control parameters 960. The memory 930 may include suitably configured program code to be executed by the processing circuitry so as to implement the above-described functionalities of the device 900, such as explained in connection with FIG. 4.

It is to be understood that the structures as illustrated in FIG. 9 are merely schematic and that the device 900 may actually include further components which, for the sake of clarity, have not been illustrated, e.g., further interfaces. The components of the device 900 may be connected in series or to a bus, or in some other way. Also, it is to be understood that the memory 930 may include further program code for implementing known functionalities of a device 900 provided as part of a fronthaul network. According to some embodiments, also a computer program may be provided for implementing functionalities of the device 900 e.g., in the form of a physical medium storing the program code and/or other data to be stored in the memory 930 or by making the program code available for download or by streaming.

It is to be understood that the examples and embodiments as explained above are merely illustrative and susceptible to various modifications. For example, the illustrated concepts may be applied in connection with various kinds of digital signal formats, without limitation to the above-mentioned examples of the CPRI, eCPRI and Ethernet. Moreover, it is to be understood that the above concepts may be implemented by using correspondingly designed software to be executed by processing circuitry of an existing device, or by using dedicated device hardware. Further, it should be noted that the illustrated devices may each be implemented as a single device or as a system of multiple interacting devices.

The invention claimed is:

1. A method of forwarding a digital signal received in an optical network, the method comprising:
receiving duplicates of the digital signal, wherein the digital signal is arranged into portions with each portion containing a timestamp and an error detection code, and the duplicates are received as a first digital signal on a first optical path of the optical network and a second digital signal on a second optical path of the optical network that is separate to the first optical path;
identifying corresponding timestamps in the first and second digital signals;
using identified corresponding timestamps to synchronize corresponding portions of the first and second digital signals such that corresponding timestamps are synchronized;
using at least one of the error detection codes to select one and only one of the corresponding portions of the first and second digital signals for forwarding; and
forwarding the selected portions of the first and second digital signals thereby forwarding the digital signal.

2. The method of claim 1, comprising applying time delays to one of the first and second digital signals to bring the corresponding portions of the first and second digital signals into synchronization.

3. The method of claim 1, comprising determining time delays between receiving corresponding timestamps of the first and second digital signals, and applying the determined time delays to the earlier of the first and second digital signals to be received to bring the corresponding portions of the first and second digital signals into synchronization.

4. The method of claim 1, comprising sending the synchronized portions of the first and second digital signals to a buffer.

5. The method of claim 1, wherein using at least one of the error detection codes to select one and only one of the corresponding portions of the first and second digital signals for forwarding comprises using the error detection code in the corresponding portion of the earlier of the first and second digital signals to be received to determine that the numbers of errors in the corresponding portion of the earlier of the first and second digital signals to be received meets a required quality, and selecting the portion of the earlier of the first and second digital signals to be received.

6. The method of claim 1, wherein using at least one of the error detection codes to select one and only one of the corresponding portions of the first and second digital signals for forwarding comprises using the error detection codes in both corresponding portions to determine errors in the corresponding portions of the first and second digital signals and selecting the corresponding portion of the digital signal containing the least errors.

7. The method of claim 1, wherein using at least one of the error detection codes to select one and only one of the corresponding portions of the first and second digital signals for forwarding comprises:
determining whether or not the corresponding portions of the first and second digital signals are identical and, if the corresponding portions are not identical, using the error detection codes in both corresponding portions to determine errors in the corresponding portions and selecting the corresponding portion of the digital signal containing the least errors.

8. The method of claim 7 comprising, if the corresponding portions are identical, selecting the corresponding portion of the earlier of the first and second digital signals to be received.

9. The method of claim 1, further comprising:
receiving the digital signal, duplicating the digital signal to produce the first and second digital signals and transmitting the first and second digital signals on the first and second optical paths respectively;
adding the timestamps such that the common timestamps occupy the same position in the portions of both the first and second digital signals; and
adding the error detection codes to the portions of both the first and second digital signals.

10. The method of claim 9, comprising:
adding the timestamps and error detection codes to portions of the digital signal before duplicating those portions of the digital signal; or
adding the timestamps and error detection codes after duplicating the digital signal, wherein the timestamps are added to occupy the same position in corresponding portions of both the first and second digital signals.

11. A device for forwarding a digital signal received in an optical network, the device comprising:
processing circuitry and a memory containing instructions executable by said processing circuitry whereby said device is operative to:
receive duplicates of the digital signal, wherein the digital signal is arranged into portions with each portion containing a timestamp and an error detection code, and the duplicates are received as a first digital signal on a first optical path of the optical network and a second digital signal on a second optical path of the optical network that is separate to the first optical path;
identify corresponding timestamps in the first and second digital signals;
use identified corresponding timestamps to synchronize corresponding portions of the first and second digital signals such that corresponding timestamps are synchronized;
use at least one of the error detection codes to select one and only one of the corresponding portions of the first and second digital signals for forwarding; and
forward the selected portions of the first and second digital signals thereby forwarding the digital signal.

12. The device of claim 11, configured to apply time delays to one of the first and second digital signals to bring the corresponding portions of the first and second digital signals into synchronization.

13. The device of claim 11, configured to determine time delays between receiving corresponding timestamps of the first and second digital signals, and to apply the determined time delays to the earlier of the first and second digital signals to be received to bring the corresponding portions of the first and second digital signals into synchronization.

14. The device of claim 11, configured to send the synchronized portions of the first and second digital signals to a buffer.

15. The device of claim 11, wherein the device is configured to use at least one of the error detection codes to select one and only one of the corresponding portions of the first and second digital signals for forwarding by:
using the error detection code in the corresponding portion of the earlier of the first and second digital signals to be received to determine that the numbers of errors in the corresponding portions of the earlier of the first and second digital signals to be received meet a required quality and selecting the portion of the earlier of the first and second digital signals to be received.

16. The device of claim 11, wherein the device is configured to use at least one of the error detection codes to select one and only one of the corresponding portions of the first and second digital signals for forwarding by:
using the error detection codes in both corresponding portions to determine errors in the corresponding portions of the first and second digital signals and selecting the portion of the digital signal containing the least errors.

17. The device of claim 11, wherein the device is configured use at least one of the error detection codes to select one and only one of the corresponding portions of the first and second digital signals for forwarding by:
determining whether or not the corresponding portions of the first and second digital signals are identical and, if the corresponding portions are not identical, using the error detection codes in both corresponding portions to determine errors in the corresponding portions and selecting the portion of the digital signal containing the least errors.

18. An optical network comprising the device of claim 11 and a further device, wherein the further device is configured:
to receive the digital signal, to duplicate the digital signal to produce the first and second digital signals and to transmit the first and second digital signals on the first and second optical paths respectively;
to add the timestamps such that the common timestamps occupy the same position in the portions of both the first and second digital signals; and
to add the error detection codes to the portions of both the first and second digital signals.

19. The optical network of claim 18, wherein the further device comprises an optical splitter and the further device is configured to pass the digital signal through the optical splitter thereby duplicating the digital signal.

20. The optical network of claim 18, wherein the further device is configured:
to add the timestamps and the error detection codes to portions of the digital signal before duplicating those portions of the digital signal; or
to add the timestamps and the error detection codes after duplicating the digital signal, wherein the timestamps are added to occupy the same position in corresponding portions of both the first and second digital signals.

* * * * *